UNITED STATES PATENT OFFICE.

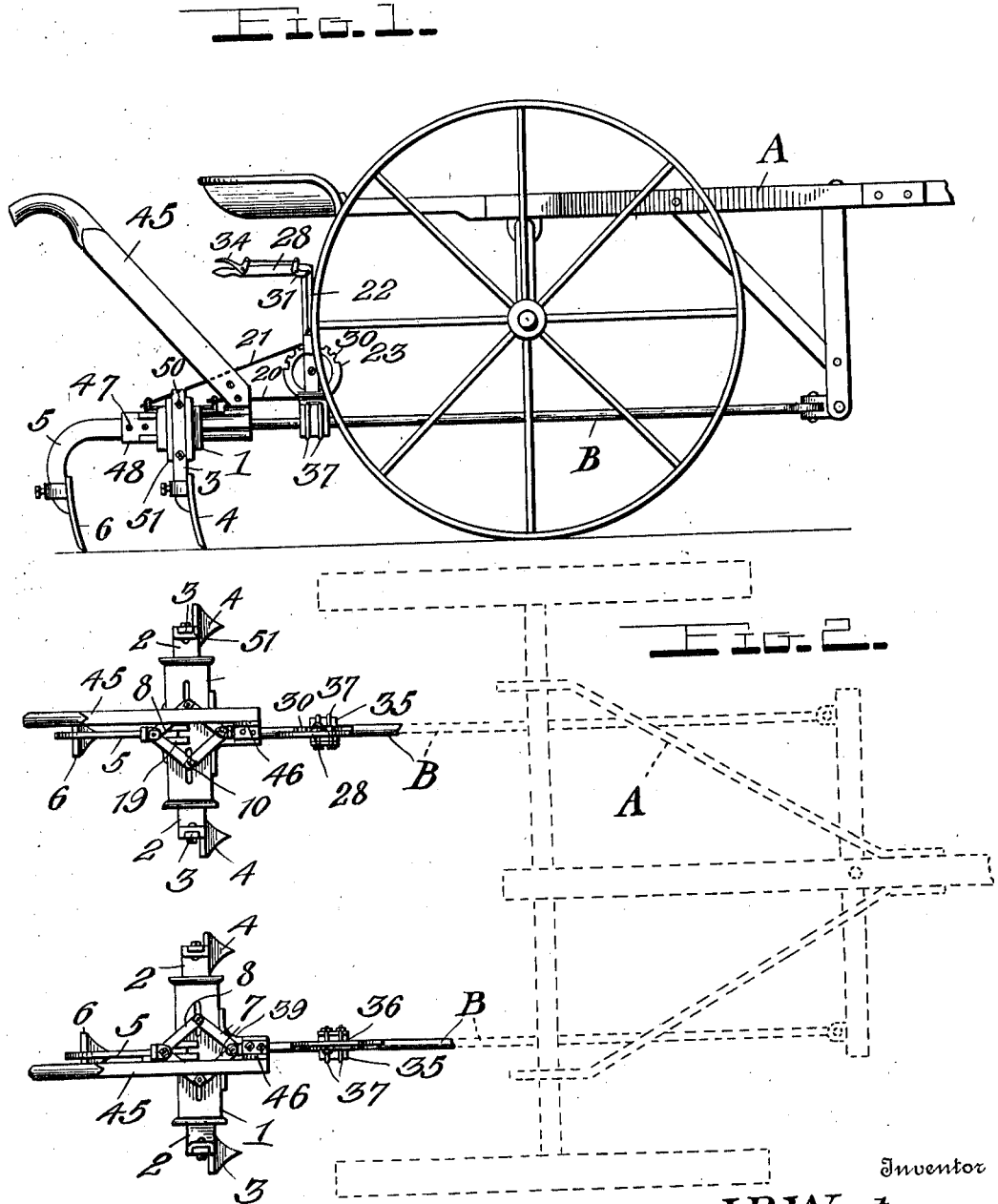

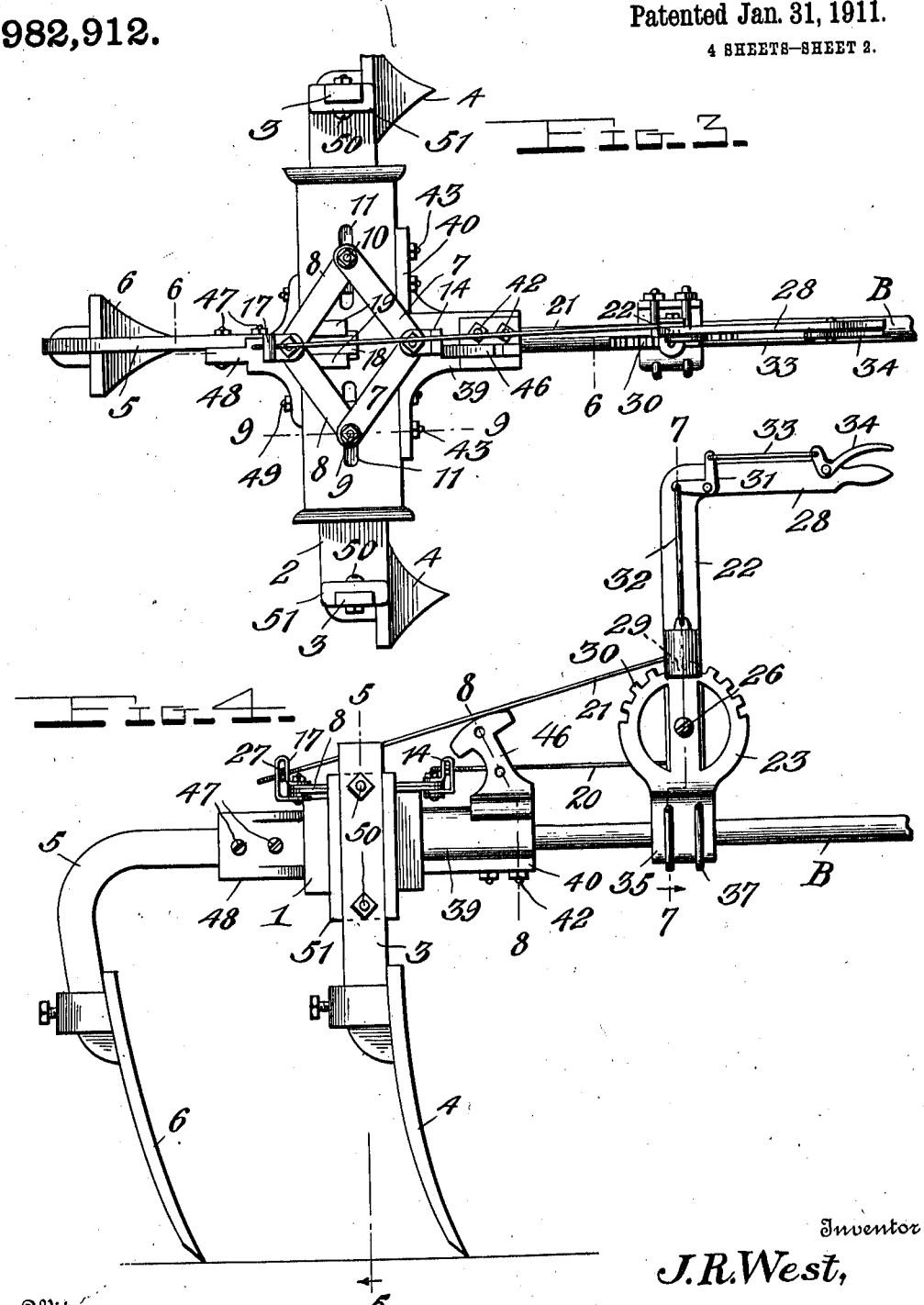

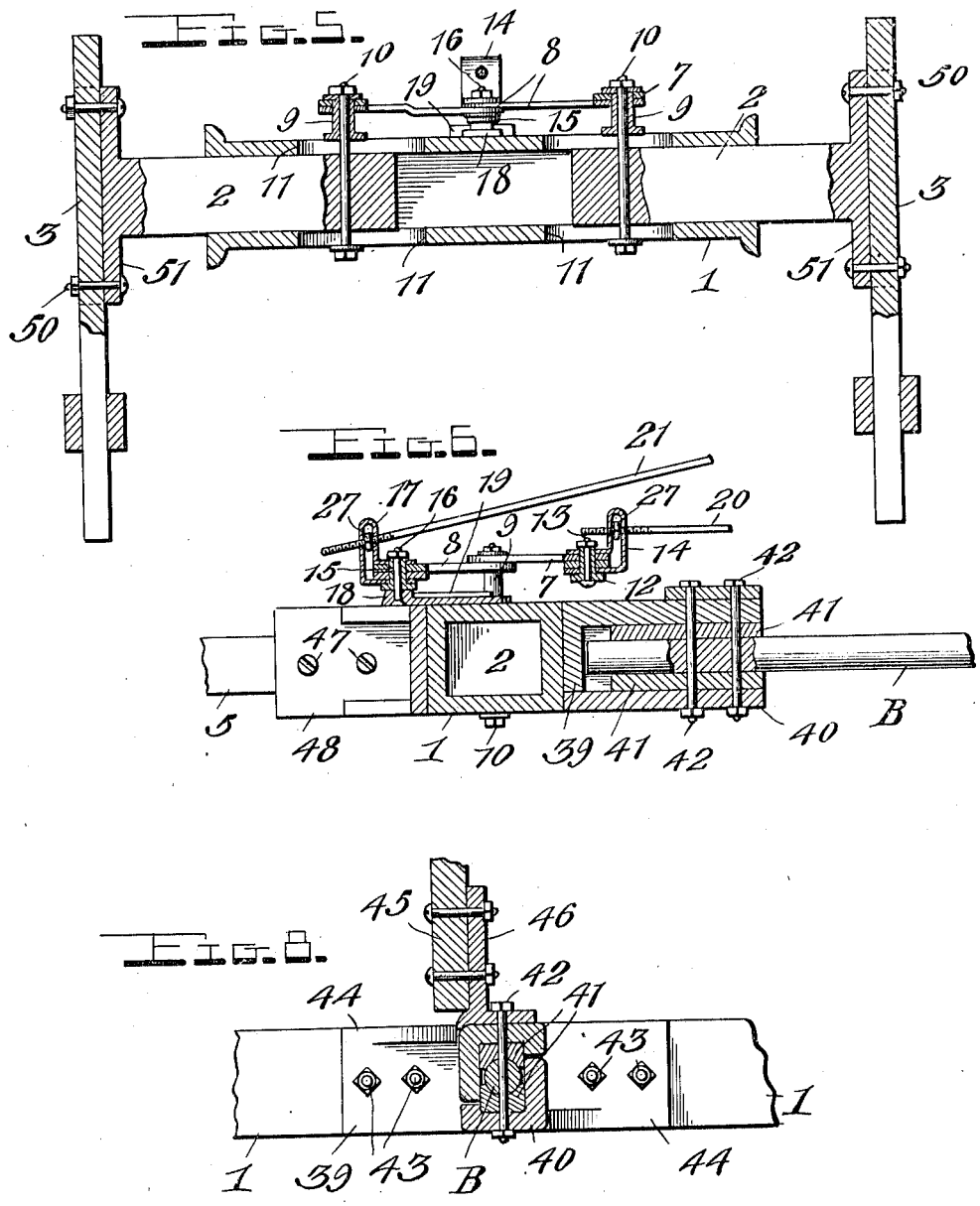

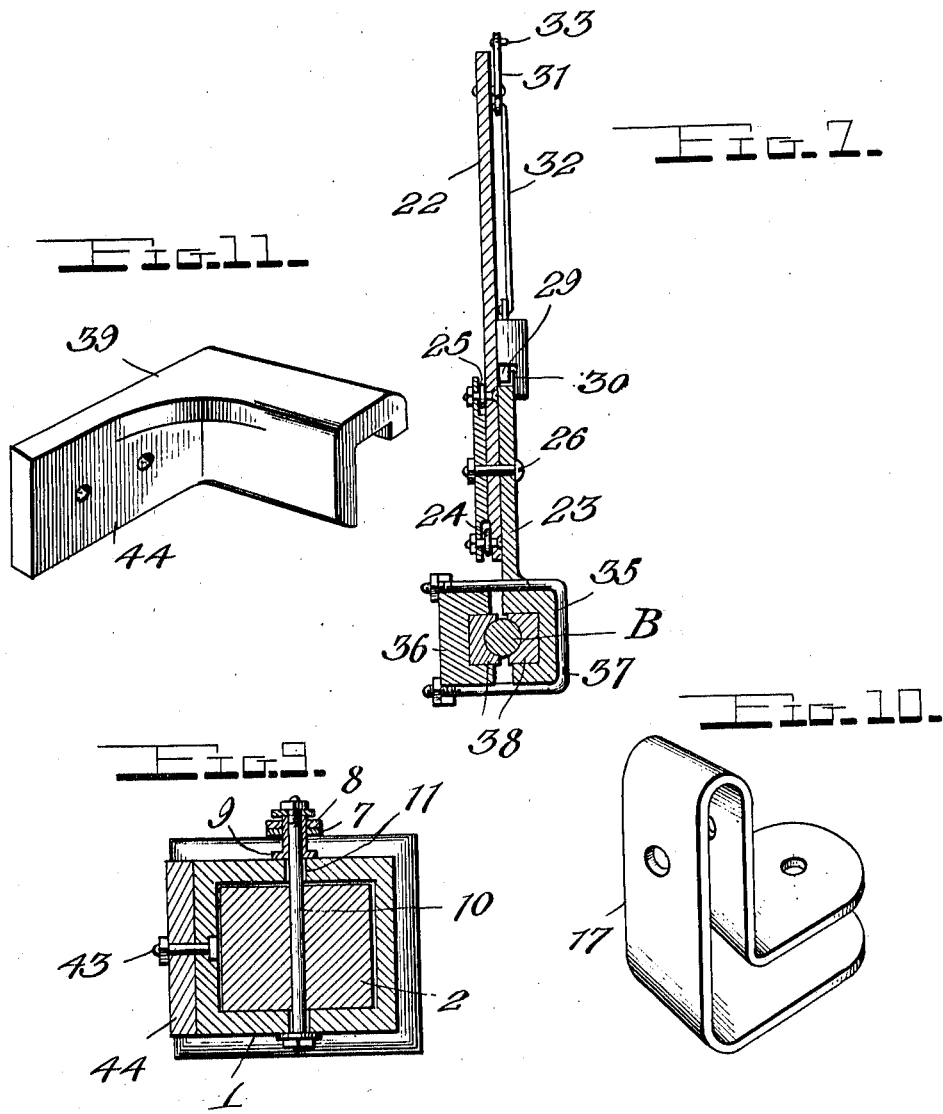

JOHN R. WEST, OF PALMER, TEXAS.

CULTIVATOR.

982,912.  Specification of Letters Patent.  Patented Jan. 31, 1911.

Application filed March 2, 1910. Serial No. 546,852.

*To all whom it may concern:*

Be it known that I, JOHN R. WEST, a citizen of the United States, residing at Palmer, in the county of Ellis and State of Texas, have invented certain new and useful Improvements in Cultivators, of which the following is a specification, reference being had to the accompanying drawings.

My invention relates to improvements in cultivators, and more particularly to means for holding or carrying the standards of cultivator shovels, plows or the like and adjusting them toward and from each other.

One object of the invention is to provide improved means for mounting and adjusting shovel or plow carrying standards.

Another object of the invention is to provide a device of this character which may be applied to the beams of ordinary wheeled cultivators, whereby two rows of plants may be effectively plowed or cultivated, and whereby the cultivator may be used either as a riding or walking cultivator.

With the above and other objects in view, the invention consists of the novel construction, combination and arrangement of parts, hereinafter fully described and claimed, and illustrated in the accompanying drawings in which:—

Figure 1 is a side elevation of one embodiment of my invention applied to a wheeled cultivator of ordinary construction; Fig. 2 is a top plan view, the cultivator being indicated in dotted lines; Fig. 3 is an enlarged plan view of one of the carriers for holding and adjusting cultivator shovel standards; Fig. 4 is a side elevation of the same partly in section; Fig. 5 is a vertical transverse section taken on the plane indicated by the line 5—5 in Fig. 4; Fig. 6 is a detail vertical section taken on the plane indicated by the line 6—6 in Fig. 3; and Figs. 7 to 11 inclusive are detail views of parts.

In the drawings A denotes an ordinary wheeled cultivator having the usual rearwardly extending, horizontal beams B loosely mounted at their forward ends.

My improved holders or carriers for the standards of cultivator or plow shovels are mounted on the rear portions of the beams B, and each comprises a transverse body 1 made preferably hollow or with hollow ends to receive slides 2 on the outer extremities of which are standards 3. The latter may be of any form and construction and may carry cultivator shovels or plows 4 or other earth-working devices; and they are adjusted toward and from each other by shifting the slides 2 as presently explained. A third standard 5 is provided at the center of the rear portion of the body or holder 1 and carries a suitable shovel or earth-working device 6 so that the shovels 4, 6, are disposed in triangular relation and plow the ground between two rows of plants, the shovel 6 working in the center of the furrow, while the shovels 4 work close to the rows of plants. By arranging two of the holders or carriers on the beams B of the cultivator A it will be seen that as the latter is drawn over one row of plants it will cultivate in effect two rows.

The slides 2 are simultaneously shifted toward and from each other within the body 1 by means of two pairs of toggle links 7, 8, which links have their adjacent ends overlapping and arranged on anti-friction sleeves 9 on upright pivot pins or bolts 10, which latter pass vertically through the slides 2, and also through longitudinal slots 11 in the top and bottom of the body 1. The forward ends of the link 7 are overlapped and arranged on an anti-friction sleeve 12, to which latter is secured by means of a bolt or fastening 13 an angular metal clip 14. The rear ends of the links 8 are likewise overlapped and engaged with an anti-friction sleeve 15 to which is connected by means of the bolt or fastening 16 an angular metal clip 17 similar to the clip 14. The pivot or bolt 16 has its lower end fixed in a slide 18 in the form of a block or plate having its edges engaged with undercut or grooved guide strips 19 secured to the top and rear portion of the body 1. The slide 18 it will be noted will guide the pivot 16 in its forward and rearward movement and thereby cause the pivots 10, and hence the slides 2 to be moved simultaneously in opposite directions and to the same extent. The clips 14, 17, have connected to them shifting rods 20, 21, the forward ends of which latter are pivotally connected to an operating lever 22 which may be fulcrumed on any suitable support. The lever 22, however, is preferably mounted on an upright bracket 23 clamped to one of the beams B and the rods 20, 21, are pivotally connected to it as shown at 24, 25, and at points equally distant from its pivot or fulcrum 26. The rear ends of the rods 20, 21, are preferably adjustably united to the clips 14, 17, by screw threading them and engaging their threaded portions with nuts 27 provided in said clips, as shown more clearly in Fig. 4 of the drawings.

In order to permit the cultivator to be used either as a riding or a walking cultivator the lever 22 is made of angular shape and has its lower vertical portion detachably and reversibly mounted on the pivot 26, the latter being preferably in the form of a bolt. By mounting the lever in this manner so that it may be reversed, its horizontal portion 28 which forms a handle may be turned to project in either a forward or rearward direction. When the cultivator is to be used as a riding cultivator the handle 28 is turned to project forwardly so as to be within reach of the operator on the seat of the machine as shown in Fig. 1, but when the latter is to be used as a walking cultivator, the handle end of the lever is turned in a rearward direction as shown in Fig. 2. Any suitable means may be provided for locking the lever 22 in adjusted position but I preferably employ the usual spring projected dog or pawl 29 which is arranged in the casing on the lever and adapted to engage a segmental series of rack teeth 30 provided on the support or bracket 23. A bell crank 31 is fulcrumed on the intermediate portion of the lever and has one of its arms connected by a link 32 to the pawl 29, and its other arm connected by a link 33 to a pivoted hand piece 34 adjacent the hand grip portion of the lever.

In order to permit the bracket or support 23 to be effectively secured to cultivator beams of different sizes and shapes, I provide an improved clamp which has one section 35 formed integral with the bracket 23. This section 35 is channeled to receive one side of the beam B and it is opposed to a similar channel section 36, the two sections being united to a clamp upon the beam by U-shaped bolts or clips 37, which latter pass through openings in the section 35 and notches in flanges on the section 36. If desired, filler blocks 38 may be arranged in the clamp sections 35, 36, and shaped to engage the exterior of the beam B, such filler sections may of course, be of any shape according to the cross sectional shape of the beam.

Any suitable means may be provided for uniting the body or casing 1 of the standard carrier to the cultivator beam or any analogous part to which the invention may be applied, but in order to permit it to be applied to beams of different sizes and shapes I preferably employ an improved sectional socket or clamp composed of two parts 39, 40. The sections 39, 40, have angular body portions which are diametrically opposed to each other and channeled to receive the end of the beam B, and if desired, the channels of the sections 39, 40, may be provided with filler blocks 41 suitably shaped to engage the beam. Vertical fastening bolts 42 pass through the clamp or socket sections 39, 40, and the beam B to effectively unite said parts, and said sections 39, 40, are united to the front face of the body or casing 1 by means of bolts or similar fastenings 43 which pass through outwardly and oppositely projecting apertured flanges 44 formed on the inner or rear ends of said sections 39, 40.

Each of the bodies 1 carries an upwardly and rearwardly inclined handle 45, the lower end of which is secured to an angular attaching bracket 46 arranged preferably on the top of the clamp section 39 and secured in position by the vertical bolts 42, which latter pass through the horizontal base portion or flange of said bracket. This construction permits the bracket to be detached when broken so that a new bracket may be readily substituted at little expense.

The central standard 5 has its rear portion downwardly curved and its front end projects forwardly and is bolted or otherwise detachably secured at 47 to a channeled rearwardly extending portion of a T-shaped bracket 48, the cross portion of which latter is here shown as bolted at 49 to the rear side of the body 1 although it will be understood that the bracket 40 may be formed integral with said body if desired. The side standards 3 are here shown as vertically disposed bars bolted or detachably secured at 50 in vertically channeled upright heads 51 formed on the outer extremities of the slides 2.

In operation, when the cultivator is drawn forwardly through the field it straddles one row of plants and the two groups of shovels or plows carried by the devices on the beams B will effectively cultivate two rows of plants. By adjusting the levers 22 the side shovels or plows 4 of each group may be positioned nearer to or farther from each other according to the width of the space between the adjacent rows of plants, and it will be noted that this adjustment may be effected without stopping the machine. When the handles 28 of the two levers are turned forwardly the machine may be used as a riding cultivator, and when turned rearwardly the handles 45 are used and the machine may be then operated as a walking cultivator.

While the preferred embodiments of the invention have been shown and described in detail, it will be understood that I do not wish to be limited to the precise construction set forth, since various changes in the form, proportion and arrangement of parts, and in the details of construction, may be resorted to within the spirit and scope of the invention.

Having thus described the invention, what is claimed is:

1. The combination of a hollow body formed with longitudinal slots, a clamping means at the center of the body for attaching it to a beam transversely of the latter, slide bars arranged in the ends of the body for longitudinal movement and carrying at their outer ends earth working devices, upright pins in said slide bars and the slots of said body, two pairs of toggle levers engaged with said pins whereby the latter serve as pivots, two other pivots uniting certain of the toggle levers, a slide mounted on the body and carrying one of the last mentioned pivots and means for shifting the two last mentioned pivots, substantially as and for the purpose set forth.

2. The combination of a hollow body formed with longitudinal slots, a clamping means at the center of the body for attaching it to a beam transversely of the latter, slide bars arranged in the ends of the body for longitudinal movement and carrying at their outer ends earth working devices, upright pins in said slide bars and the slots of said body, two pairs of toggle levers engaged with said pins whereby the latter serve as pivots, two other pivots uniting certain of the toggle levers, a slide mounted on the body and carrying one of the last mentioned pivots, a beam engaging clamp, a lever mounted thereon, co-acting locking devices on the lever and clamp and operating rods connected to the lever and to the two last mentioned pivots.

In testimony whereof I hereunto affix my signature in the presence of two witnesses.

JOHN R. WEST.

Witnesses:
N. OTIS REDDELL,
JOE BARNETT.